UNITED STATES PATENT OFFICE.

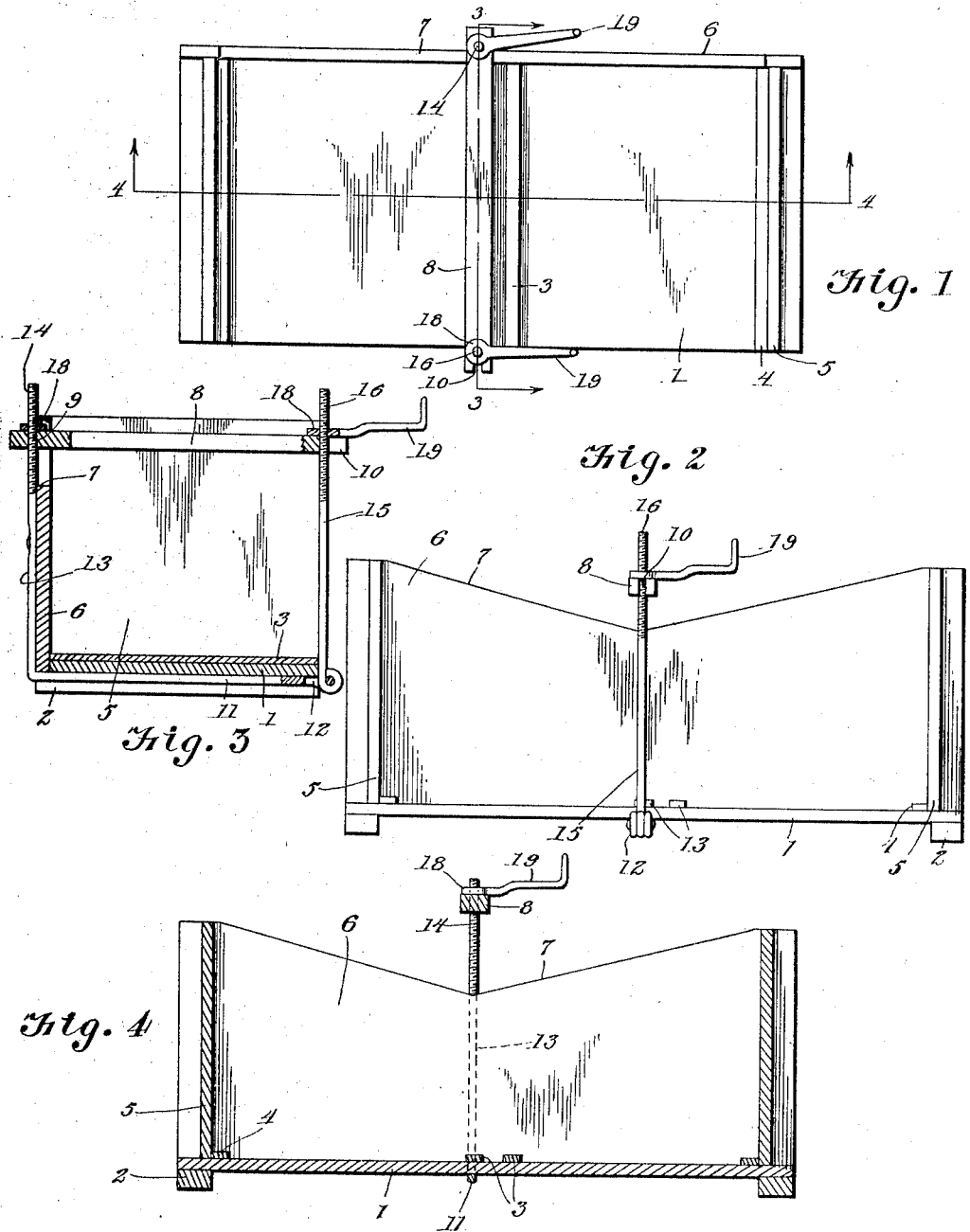

JOSEPH L. JOHNSON, OF KELLEY, IOWA.

SHINGLE-BALER.

1,334,904.　　　　Specification of Letters Patent.　　Patented Mar. 23, 1920.

Application filed April 1, 1919. Serial No. 286,663.

*To all whom it may concern:*

Be it known that I, JOSEPH L. JOHNSON, a citizen of the United States, residing at Kelley, in the county of Story and State of Iowa, have invented new and useful Improvements in Shingle-Balers, of which the following is a specification.

The object of my present invention is to provide a simple, inexpensive, durable and easily operated apparatus, designed more especially for use in lumber yards and analogous places in the rebaling of shingles when the original bales or bundles become broken.

To the attainment of the foregoing the invention consists in the peculiar and advantageous shingle baler hereinafter described and definitely claimed.

In the accompanying drawings, hereby made a part hereof:

Figure 1 is a top plan view of my improved baler.

Fig. 2 is a side elevation of the same.

Fig. 3 is a transverse section taken in the plane indicated by the line 3—3 of Fig. 1, looking in the direction of the arrow.

Fig. 4 is a detail longitudinal vertical section, taken in the plane indicated by the line 4—4 of Fig. 1.

Similar numerals of reference designate corresponding parts in all the views of the drawings.

My novel baler may be formed of wood or of any other material compatible with its purpose, though it is preferable for obvious reasons to form the major portion of the baler of wood. It comprises a bottom 1, transverse rests 2 fixed to the under side of the wall at the ends thereof, transverse strips 3 fixed to the upper side of the bottom 1 at opposite sides and adjacent to the transverse center thereof, and transverse strips 4, fixed to the upper side of the bottom at points adjacent to the ends thereof. Fixed to the bottom 1 and arranged against the outer sides of the strips 4 are end retaining walls 5, and fixed to one longitudinal edge of the bottom 1 is a side retaining wall 6, the upper edge of which is cut away as shown, to form an obtuse angle, as indicated by 7. All of the elements thus far specifically described are preferably made of wood as is also a crown-bar 8, apertured at 9 and having in its end remote from said aperture a bifurcation 10.

Fixed to the under side of the bottom 1 and extending transversely thereof is a metallic bar 11, on which is a bifurcated portion 12 that extends beyond the open side of the baler body. The said transverse bar 11 merges into an upstanding arm 13 which is fixed to the outer side of the side wall 6 and is threaded at its upper end, as indicated by 14. Pivoted to swing vertically in the bifurcation 12 is a rod 15, threaded at its upper end, as indicated by 16. All of these elements are formed of metal, as are also nuts 18 that are carried by handles 19.

In the practical use of my novel baler the shingles to be rebaled are assembled in superimposed relation upon the strips 3 and 4 and within the retaining walls 5 and 6, and when the proper number of shingles are assembled, the crown-bar 8 is swung to position above the shingles, and the rod 15 is swung into the bifurcation 10 of the crown-bar. The nuts are then turned downwardly upon the elements by which they are carried, whereupon the shingles will be readily clamped in the baler. The shingles are then secured in the baled state by a bale-tie applied in the usual or any other approved manner, the space between the strips 3 facilitating the application of the bale-tie below the assembled shingles.

Having described my invention, what I claim and desire to secure by Letters-Patent, is:

1. In a shingle baler the combination with a body having a bottom and end and side retaining walls and also having raised portions on the bottom, of a fixed rod rising at the outer side of the side retaining wall and threaded at its upper end, a swinging and threaded rod connected with the body at the open side thereof, a crown-bar apertured to receive the fixed rod and bifurcated to receive the swinging rod, and nuts mounted on said rods and adapted to crowd the crown-bar downwardly.

2. A shingle baler comprising a body having a bottom, transverse raised portions thereon, the intermediate raised portion being arranged in spaced relation adjacent to the transverse center of the bottom, end retaining walls fixed with respect to the bottom, and a side retaining wall fixed with respect to the bottom and the end walls and having an upper edge that describes an obtuse angle, in combination with a crown-bar apertured adjacent to one end and having its opposite end bifurcated, a fixed transverse bar having a bifurcated portion at the open side of the body, an upright threaded rod integral with said transverse bar and fixed at the outer side of the side retaining wall, a swinging and threaded rod pivoted in the bifurcation of the bar, and nuts mounted on said threaded rods to crowd the crown-bar downwardly and having handles.

In testimony whereof I affix my signature.

JOSEPH L. JOHNSON.